United States Patent [19]

Gallivan

[11] 4,061,700
[45] Dec. 6, 1977

[54] FUGITIVE BINDER FOR NUCLEAR FUEL MATERIALS

[75] Inventor: Timothy Joseph Gallivan, Wilmington, N.C.

[73] Assignee: General Electric Company, San Jose, Calif.

[21] Appl. No.: 612,084

[22] Filed: Sept. 10, 1975

[51] Int. Cl.$^2$ ............................................. G21C 21/00
[52] U.S. Cl. ............................... 264/0.5; 252/301.1 R
[58] Field of Search .................... 264/.5; 252/301.1 R; 176/89, 90

[56] References Cited

U.S. PATENT DOCUMENTS

| | | | |
|---|---|---|---|
| 3,312,631 | 4/1967 | Smith et al. | 264/.5 X |
| 3,330,889 | 7/1967 | Samos et al. | 264/.5 |
| 3,345,437 | 10/1967 | Flack et al. | 264/.5 |
| 3,728,421 | 4/1973 | Noothout | 264/.5 |
| 3,812,050 | 5/1974 | Steele | 264/.5 |
| 3,953,286 | 4/1976 | Watson et al. | 264/.5 X |
| 3,963,828 | 6/1976 | Becker | 252/301.1 R X |

Primary Examiner—Peter A. Nelson

Attorney, Agent, or Firm—Ivor J. James, Jr.; Samuel E. Turner; Sam E. Laub

[57] ABSTRACT

A process for fabricating a body of a nuclear fuel material has the steps of admixing the nuclear fuel material in powder form with a binder of a compound or its hydration products containing ammonium cations and anions selected from the group consisting of carbonate anions, bicarbonate anions, carbamate anions and mixtures of such anions, forming the resulting mixture into a green body such as by die pressing, heating the green body to decompose substantially all of the binder into gases, further heating the body to produce a sintered body, and cooling the sintered body in a controlled atmosphere. Preferred binders used in the practice of this invention include ammonium bicarbonate, ammonium carbonate, ammonium bicarbonate carbamate, ammonium sesquicarbonate, ammonium carbamate and mixtures thereof. This invention includes a composition of matter in the form of a compacted structure suitable for sintering comprising a mixture of a nuclear fuel material and a binder of a compound or its hydration products containing ammonium cations and anions selected from the group consisting of carbonate anions, bicarbonate anions, carbamate anions and mixtures of such anions.

9 Claims, 4 Drawing Figures

FUGITIVE BINDER FOR NUCLEAR FUEL MATERIALS

BACKGROUND OF THE INVENTION

The present invention relates generally to the art of forming and sintering ceramic powders and is particularly concerned with a method for sintering a uranium dioxide nuclear fuel body having a fugitive binder.

Various materials are used as nuclear fuels for nuclear reactors including ceramic compounds of uranium, plutonium and thorium with particularly preferred compounds being uranium oxide, plutonium oxide, thorium oxide and mixtures thereof. An especially preferred nuclear fuel for use in nuclear reactors is uranium dioxide.

Uranium dioxide is produced commercially as a fine, fairly porous powder which cannot be used directly as nuclear fuel. It is not a free-flowing powder but clumps and agglomerates, making it difficult to pack in reactor tubes to the desired density.

The specific composition of a given commercial uranium dioxide powder may also prevent it from being used directly as a nuclear fuel. Uranium dioxide is an exception to the law of definite proportions since "$UO_2$" actually denotes a single, stable phase that may vary in composition from $UO_{1.7}$ to $UO_{2.25}$. Because thermal conductivity decreases with increasing O/U ratios, uranium dioxide having as low an O/U ratio as possible is preferred. However, since uranium dioxide powder oxidizes easily in air and absorbs moisture readily, the O/U ratio of this powder is significantly in excess of that acceptable for fuel.

A number of methods have been used to make uranium dioxide powder suitable as a nuclear fuel. Presently, the most common method is to die press the powder into cylindrically-shaped green bodies of specific size without the assistance of fugitive binders since the complete removal of these binders and their decomposition products is difficult to achieve prior to sintering. The entrainment of binder residues is unacceptable in sintered nuclear fuels. Sintering atmospheres may range from about 1000° C to about 2400° C with the particular sintering temperature depending largely on the sintering atmosphere. For example, when wet hydrogen gas is used as the sintering atmosphere, its water vapor accelerates the sintering rate thereby allowing the use of correspondingly lower sintering temperatures such as a temperature of about 1700° C. The sintering operation is designed to densify the bodies and bring them down to the desired O/U ratio or close to the desired O/U ratio.

Although uranium dioxide suitable as a nuclear fuel can have an O/U ratio ranging from 1.7 to 2.015, as a practical matter, a ratio of 2.00 and suitably as high as 2.015 has been used since it can be consistently produced in commercial sintering operations. In some instances, it may be desirable to maintain the O/U ratio of the uranium dioxide at a level higher than 2.00 at sintering temperature. For example, it may be more suitable under the particular manufacturing process to produce a nuclear fuel having an O/U ratio as high as 2.195, and then later treat the sintered product in a reducing atmosphere to obtain the desired O/U ratio.

One of the principal specifications for uranium dioxide sintered bodies to be used for a nuclear reactor is their density. The actual value may vary but in general uranium dioxide sintered bodies having densities of the order of 90% to 95% of theoretical density are specified and occasionally a density as low as 85% of theoretical is specified. Most pressed uranium dioxide powder, however, will sinter to final densities of about 96% to 98% of theoretical. Therefore, to obtain sintered bodies with lower densities the time and temperature must be carefully controlled to allow the shrinkage of the body to proceed only to the desired value. This is inherently more difficult than the use of a process which is allowed to go to completion. Specifically, small variations during sintering can result in large variations or no significant variations in the sintered body of compacted powder depending on a number of factors such as the powder chemistry, particle size and agglomeration. Generally, however, a change in sintering time such as, for example an hour or two, does not significantly change the density of the final sintered product. Also, when sintered bodies having the desired low density have been attained by carefully controlling sintering time and temperature, it has been found that these sintered bodies, when placed in the reactor, frequently undergo additional sintering within the reactor thereby interfering with proper reactor operation.

A number of techniques have been used in the past to reduce the density of the sintered body other than varying time and temperature. For example, one technique has been to press the uranium dioxide powder, break it up and repress it. The problem with this technique is that the resulting sintered body has large interconnecting pores throughout the body which extend out to the surface resulting in a large exposed surface area which can absorb into the body significant amounts of gases, and in particular water in the form of water vapor. During reactor operation these gases are liberated providing a possible source of corrosion for the fuel cladding. Another method involves adding a plastic of selected particle size to the uranium dioxide powder. The admixed powder is then pressed and sintered, however the decomposition of the plastic during sintering usually results in carbon residues which contaminate the nuclear fuel.

In U.S. patent application Ser. No. 437,837 filed Jan. 30, 1974 (and now abandoned) in the name of Kenneth W. Lay and assigned to the same assignee as the present invention, there is disclosed a process for controlling the end-point density of a sintered uranium dioxide nuclear fuel body and the resulting product. Uranium dioxide powder having a size ranging up to 10 microns is admixed with a precursor to uranium dioxide, such as ammonium diuranate, having an average agglomerated particle size ranging from about 20 microns to 1 millimeter and the mixture is formed into a pressed compact or green body. The body of the precursor and the uranium dioxide has a density lower than that of the uranium dioxide powder and the precursor is used in an amount which results in discrete low density regions in the green body which range from about 5% to 25% by volume of the green body. The green body is sintered to decompose the precursor and produce a sintered body having discrete low density porous regions which reduce the end-point density of the sintered body by at least 2%. The sintered body has an end-point density ranging from 85% to 95% of theoretical.

In copending U.S. patent application Ser. No. 598,839, filed July 24, 1975 (and now abandoned) and assigned to the same assignee as the present invention there is disclosed a process for controlling the final or end-point density of a sintered uranium dioxide nuclear fuel body by adding ammonium oxalate to a nuclear fuel material such as uranium dioxide before pressing into a green body. This addition results in discrete low density porous regions in the sintered body which correspond to the ammonium oxalate particles. The end-point density of the sintered body is, therefore, a function of the amount of ammonium oxalate added.

As previously mentioned, conventional organic or plastic binders are unsuitable for use in powder fabrication since they tend to contaminate the interior of the sintered body with impurities such as hydrides. These binders are normally converted to gases during the sintering step and these gases must be removed, requiring special apparatus or procedures. In addition, upon decomposition, these prior art binder materials often leave deposits of organic materials in the equipment utilized to sinter the article, thereby complicating the maintenance procedures for the equipment.

In the sintering process, it is desirable to develop strong diffusion bonds between the individual particles without significantly reducing the interconnecting porosity of the body. The use of organic binders along with normal compacting pressures and sintering temperatures inhibits the formation of these strong bonds. The higher compacting pressures and sintering temperatures required to develop such bonds sharply reduce the desired porosity.

There is a particular need, therefore, in the art of preparing sintered bodies for nuclear reactors by powder ceramic techniques for a binder which will impart an adequate degree of green strength without contaminating the interior of such bodies and which will permit, through sintering, the formation of strong bonds between particles without deleteriously affecting the porosity.

SUMMARY OF THE INVENTION

This invention presents the improvement of utilizing a binder of a compound or its hydration products containing ammonium cations and anions selected from the group consisting of carbonate anions, bicarbonate anions, carbamate anions and mixtures of such anions, preferably a binder selected from the group consisting of ammonium bicarbonate, ammonium carbonate, ammonium bicarbonate carbamate, ammonium sesquicarbonate, ammonium carbamate and mixtures thereof, in a powder ceramic process for imparting green strength to articles cold pressed from nuclear fuel powders of varying particle size and a particular shape or configuration for which it is desired to maintain a certain degree of porosity, uniformity of pore size, a lack of interconnections between the pores and the shape or configuration of the base material particles in the final article after sintering. The binders disclosed in this invention are efficient binders for use in nuclear fuels, and further the binders enable the realization of defect free, pressed bodies of nuclear fuel materials and tensile strength in the bodies comparable to strengths achieved with long chain hydrocarbon binders. Further the binders in this invention leave substantially no impurities in the nuclear fuel material since these binders decompose upon heating into ammonia ($NH_3$), carbon dioxide ($CO_2$) and water ($H_2O$) (or water vapor) at temperatures as low as 30° C.

The binder addition to nuclear fuel material as presented in this invention enables the practice of a process for forming and sintering a body of a nuclear fuel having the steps of admixing the nuclear fuel material in particulate form with the binder, forming the resulting mixture into a green body having a density ranging from about 30% to about 70% of theoretical density of the nuclear fuel material, heating said green body to decompose substantially all the binder into gases, further heating the body to produce a sintered body and cooling the sintered body in a controlled atmosphere.

This invention also provides a composition of matter that is suitable for sintering in the form of a compacted structure comprising a mixture of a nuclear fuel material and a binder of a compound or its hydration products containing ammonium cations and anions selected from the group consisting of carbonate anions, bicarbonate anions, carbamate anions and mixtures of such anions and preferably a binder selected from the group consisting of ammonium bicarbonate, ammonium carbonate and mixtures thereof.

OBJECTS OF THE INVENTION

It is an object of this invention to provide an additive of a binder of a compound or its hydration products containing ammonium cations and anions selected from the group consisting of carbonate anions, bicarbonate anions, carbamate anions and mixtures of such anions for a nuclear fuel material that serves to bind the particles of nuclear fuel into green shapes suitable for sintering.

Another preferred object of this invention is to provide a binder selected from the group consisting of ammonium bicarbonate, ammonium carbonate, ammonium bicarbonate carbamate, ammonium sesquicarbonate, ammonium carbamate or mixtures thereof as an addition to nuclear fuel materials and which, upon heating at moderate temperatures before a sintering process, decompose into gases and leave substantially no impurities in the sintered structures of the nuclear fuel material.

Still another object of this invention is to provide a process for sintering green shapes of a nuclear fuel material using a binder of a compound or its hydration product containing ammonium cations and anions selected from the group consisting of carbonate ions, bicarbonate anions, carbamate anions and mixtures of such anions.

Other objects and advantages of this invention will become apparent from the following specification and the appended claims.

DETAILED DESCRIPTION OF THE INVENTION

Figure 1:
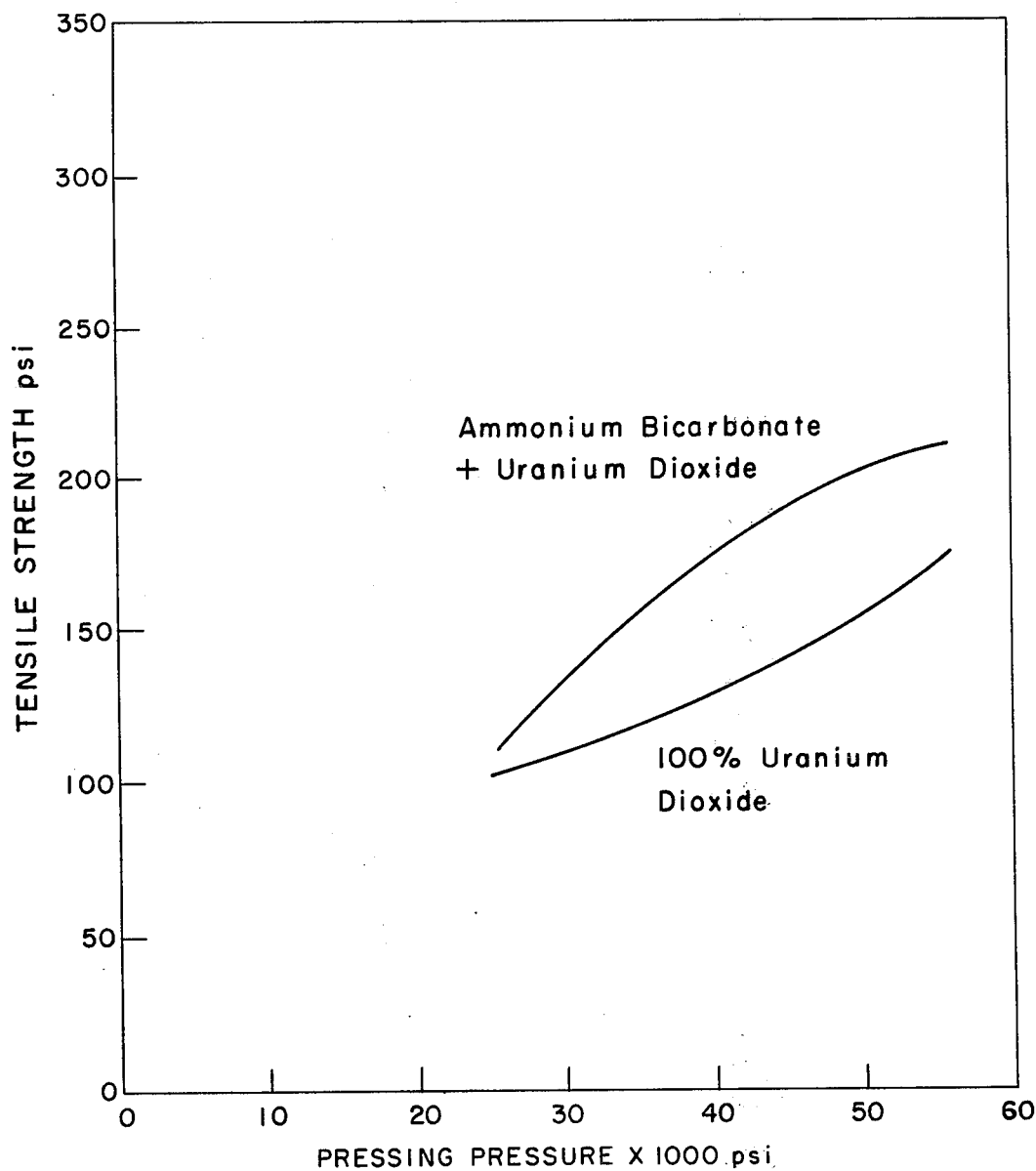
FIG. 1 presents a graph of tensile strength versus die pressing pressure for one group of green pellets without a binder and one group of green pellets with a binder disclosed in this invention.

It has now been discovered that a process for sintering a green body of a nuclear fuel material having high reliability can be achieved by admixing a fugitive binder of a compound or its hydration products containing ammonium cations and anions selected from the group consisting of carbonate anions, bicarbonate anions, carbamate anions and mixtures of such anions with a nuclear fuel material in powder form. In greater detail the process can be conducted by practicing the steps of providing a powder of the nuclear fuel material, admixing the nuclear fuel material with a binder of a compound or its hydration products containing ammonium cations and anions selected from the group consisting of carbonate anions, bicarbonate anions, carbamate anions and mixtures of such anions, forming the resulting mixture into a green body having a density ranging from about 30% to about 70% of theoretical density, heating the green body sufficiently to decompose the binder into gases and thereafter heating the body to produce a sintered body having a controlled porosity and a controlled density.

The practice of the foregoing process results in the production of a composition of matter in the form of a compacted structure suitable for sintering and is comprised of a mixture of a nuclear fuel material and a binder of a compound or its hydration products containing ammonium cations and anions selected from the group consisting of carbonate anions, bicarbonate anions, carbamate anions and mixtures of such anions.

As used herein, nuclear fuel material is intended to cover the various materials used as nuclear fuels for nuclear reactors including ceramic compounds such as oxides of uranium, plutonium and thorium with particularly preferred compounds being uranium oxide, plutonium oxide, thorium oxide and mixtures hereof. An especially preferred nuclear fuel for use in this invention is uranium oxide, particularly uranium dioxide. Further the term nuclear fuel is intended to cover a mixture of the oxides of plutonium and uranium and the addition of one or more additives to the nuclear fuel material such as gadolinium oxide ($Gd_2O_3$).

In carrying out the present process which will be discussed for the preferred use of uranium dioxide, the uranium dioxide powder (or particles) used generally has an oxygen to uranium atomic ratio greater than 2.00 and can range up to 2.25. The size of the uranium dioxide powder or particles ranges up to about 10 microns and there is no limit on lower particle size. Such particle sizes allow the sintering to be carried out within a reasonable length of time and at temperatures practical for commercial applications. For most applications, to obtain rapid sintering, the uranium dioxide powder has a size ranging up to about 1 micron. Commercial uranium dioxide powders are preferred and these are of small particle size, usually sub-micron generally ranging from about 0.02 micron to 0.5 micron.

Compositions suitable for use as a binder in the practice of this invention either alone or in mixtures, include ammonium bicarbonate, ammonium carbonate, ammonium bicarbonate carbamate, ammonium sesquicarbonate, ammonium carbamate and mixtures thereof. When mixed with nuclear fuel materials, these binders and the nuclear fuel material are believed to undergo the phenomenon of adhesion forming an ammonium derivative of the carbonate series such as

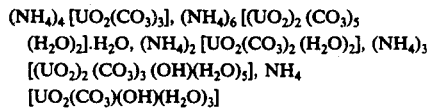

and $UO_2CO_3 \cdot H_2O$, or mixtures of these.

In the present invention the binder should have certain characteristics. It must be substantially comprised of a compound or its hydration products containing ammonium cations and anions selected from the group consisting of carbonate anions, bicarbonate anions, carbamate anions and mixtures of such anions and free of impurities so that it can be mixed with uranium dioxide powder and pressed and sintered without leaving any undesired impurities after heating with particularly preferred binders being ammonium bicarbonate and ammonium carbonate and mixtures thereof. It has been found that commercially available ammonium bicarbonate contains virtually no impurities and commercially available ammonium carbonate also contains virtually no impurities except for other ammonium compounds as listed in the foregoing paragraph. Thermogravimetric analysis confirms that there is a complete volatilization of ammonium bicarbonate and ammonium carbonate at heating rates typically used for reductive atmospheric $UO_2$ sintering. Ammonium bicarbonate and ammonium carbonate when heated to the temperature range of decomposition, decompose to form ammonia, carbon dioxide and water at significant rates leaving substantially no contaminants (impurities) in the fuel and no undesirable residues in the sintering furnace. Additionally the ammonium bicarbonate and the ammonium carbonate are used in small particle sizes of 400 mesh or less in order to achieve maximum plastic flow of the binder into the interstices of the nuclear fuel material. Ammonium carbonate is used as the binder when the combination of binding and density reducing pores is desired in the nuclear fuel. Ammonium bicarbonate is used as the binder when it is desired to avoid the formation of density reducing pores in the nuclear fuel material. The plasticity of ammonium bicarbonate and ammonium carbonate may be demonstrated by the fact that these compounds can be die pressed to green densities as high as 90% of theoretical density at moderate pressing pressures.

The amount of binder added to the nuclear fuel material generally ranges from about 0.5 to about 7.0 weight percent depending on the formability of the nuclear fuel material. For example formable uranium dioxide powders require less of an addition of the binder while less readily formable powders require larger amounts of binder. When the selected binder is ammonium carbonate, the amount of the addition of this binder is dependent upon the desired sintered density for the nuclear fuel material.

Homogenous blending of the binder with the nuclear fuel material is practiced to develop fully the binding action of the binder on the nuclear fuel material. Where porosity or a lower density is not desired, the homogenous blending of the binder with the nuclear fuel material avoids the formation of agglomerates of the binder since such agglomerates can volatize during sintering leaving pores in the sintered nuclear fuel material which pores reduce the density of the nuclear fuel material in sintered bodies. When it is felt that agglomerates of the binder exist in the nuclear fuel material after mixing, a milling process such as jet milling or hammer milling is practiced so that the agglomerates are destroyed. The blended and milled powder may then be predensified by low pressure die pressing followed by granulation through a sizing screen to promote flowability of the mixture.

In order to control the density of sintered bodies of nuclear fuel material, pore formers such as ammonium oxalate or a uranium precursor may be added to the nuclear fuel material along with the binders of this invention. The pore former can be mixed either at the same time as the binders disclosed in this invention or during a subsequent mixing step. In the event that the nuclear fuel material, binder and pore former are mixed and then milled to promote homogeneity, the processing is conducted to yield an acceptable particle size after milling to assure the formation of pores during sintering.

The resulting mixture of nuclear fuel material with the binders of this invention, with or without pore former, can be formed into a green body, generally a cylindrical pellet by a number of techniques such as pressing (particularly die pressing). Specifically, the mixture is compressed into a form in which it has the required mechanical strength for handling and which, after sintering, is of the size which satisfies reactor specification. The presence of the binders of this invention in the nuclear fuel material significantly enhances both the strength and integrity of the resulting green body. The green body can have a density ranging from about 30% to 70% of theoretical, but usually it has a density ranging from about 40% to 60% of theoretical, and preferably about 50% of theoretical.

The green body is sintered in an atmosphere which depends on the particular manufacturing process. Specifically, it is an atmosphere which can be used to sinter uranium dioxide alone in the production of uranium dioxide nuclear fuel and also it must be an atmosphere which is compatible with the gases resulting from the decomposition of ammonium bicarbonate. For example, a number of atmospheres can be used such as an inert atmosphere, a reducing atmosphere (e.g. dry hydrogen) or a controlled atmosphere comprised of a mixture of gases (e.g. a mixture of hydrogen and carbon dioxide as set forth in U.S. Pat. No. 3,872,022) which in equilibrium produces a partial pressure of oxygen sufficient to maintain the uranium dioxide at a desired oxygen to uranium ratio.

The rate of heating to sintering temperature is limited largely by how fast the by-product gases are removed prior to achieving a sintering temperature and generally this depends on the gas flow rate through the furnace and its uniformity therein as well as the amount of material in the furnace. Specifically, the rate of flow of gas through the furnace, which ordinarily is substantially the same gas flow used in the sintering atmosphere, should be sufficient to remove the gases resulting from decomposition of ammonium bicarbonate before sintering temperature is reached. Generally, best results are obtained when the rate of heating to decompose the binder ranges from about 50° C per hour to about 300° C per hour. After decomposition of the binder is completed and byproduct gases substantially removed from the furnace, the rate of heating can then be increased, if desired, to a range of about 300° C to 500° C per hour and as high as 800° C per hour but not be so rapid as to crack the bodies.

Upon completion of sintering, the sintered body is usually cooled to room temperature. The rate of cooling of the sintered body is not critical in the present process, but it should not be so rapid as to crack the sintered body. Specifically, the rate of cooling can be the same as the cooling rates normally or usually used in commercial sintering furnaces. These cooling rates may range from 100° C to about 800° C per hour, and generally, from about 400° C per hour to 600° C per hour.

The sintered uranium dioxide bodies are preferably cooled in the same atmosphere in which they were sintered.

This invention provides several advantages in the sintering of nuclear fuel materials and in the resulting sintered pellets. The addition of the binders of this invention, particularly ammonium bicarbonate, ammonium carbonate, or mixtures thereof, does not leave any undesirable residue in the sintered pellets. Thermogravimetric analysis has shown that ammonium bicarbonate and ammonium carbonate decompose completely into ammonia ($NH_3$), carbon dioxide ($CO_2$) and water vapor ($H_2O$). The early decomposition of ammonium bicarbonate and ammonium carbonate prevents the entrapment of undesirable gases in the microstructure of the nuclear fuel material during the sintering process. Pellets incorporating ammonium bicarbonate or ammonium carbonate according to the teachings of this invention can be sintered using conventional wet hydrogen as a sintering gas or controlled atmosphere sintering under an atmosphere comprising a mixture of hydrogen and carbon dioxide. The process is conducted so that the gases from the decomposition of ammonium bicarbonate or ammonium carbonate are excluded from the sintering atmosphere such as by using the countercurrent flow of the sintering atmosphere in a sintering furnace.

The invention is further illustrated by the following examples.

EXAMPLE 1

Ammonium bicarbonate was hammer milled to an average particle size of about 20 microns.

Uranium dioxide having an oxygen to uranium ratio of about 2.05 and an average particle size of 0.7 microns was blended with the ammonium bicarbonate in a ratio of 1.3 grams of ammonium bicarbonate to 98.7 grams of uranium dioxide. Three thousand grams of blended powder were prepared in this manner.

The blended powders were hammer milled to destroy any uranium dioxide aggregates in order to assure a homogenous distribution of ammonium bicarbonate in the uranium dioxide powder.

The hammer milled powder was die pressed at 6700 psi to increase its bulk density and the resulting structures were crushed through a 12 mesh screen to promote both flowability and control of the agglomerate size.

The resulting powder was die pressed into cylindrical fuel pellets using pressures ranging from 26,000 to 54,000 psi. As a reference, 2 groups of fuel pellets were also die pressed at the same pressures from the original batch of uranium dioxide powder. One reference group (hereinafter Group 1) contained no binder and received no other processing prior to pressing. The other reference group (hereinafter Group 2) also contained no binder but was hammer milled, die pressed, and crushed through a sizing screen prior to die pressing.

Tensile strengths as measured by diametrical compression tests were conducted on the binder pellets and the 2 reference groups. The binderless reference pellets of Group 2 were too weak for tensile strength measurements. The tensile strength vs. die pressing pressure curves for the remaining pellets are shown in FIG. 1. The pellets containing binder clearly possess superior tensile strength for all pressing pressures.

EXAMPLE 2

Three hundred and sixty kilograms of uranium dioxide powder having an O/U ratio of 2.04 and an average particle size of 0.6 microns were mixed with an ammonium bicarbonate binder following the procedure in Example 1. The powders were die pressed into cylindrical fuel pellets at a green density ranging from 4.9 to 5.1 grams/cm³ using 0.536 inch diameter tooling. The green fuel pellets were randomly loaded 3½ inches deep in molybdenum sintering boats.

The sintering boats were stoked into a continuous furnace having an atmosphere of dissociated ammonia using a 45 inches/hour push rate and a temperature rise of 8° C/minute.

The furnace was of sufficient length to assure a residence time of 4 hours at the peak sintering temperature of 1720° C for the pellets. The atmosphere was comprised of dissociated ammonia having a dew point of 67° Centigrade. One hundred and ninety ft³/hour of dissociated ammonia was introduced at a point ⅓ of the furnace length from the pellet entry end for impurity removal and another 225 ft³/hour was introduced at the pellet removal end of the furnace to provide a clean sintering atmosphere. The gases were removed at the pellet entry end of the furnace so that the gas flow was countercurrent to the passage of the boats through the furnace.

For the sintered pellets, the average oxygen to uranium ratio was 2.003, the average carbon was 7.50 ppm, the average hydrogen was 0.131 ppm, the average nitrogen was 12.89 ppm, and the average total outgas was 3.41 microliters/gram.

Figure 2:
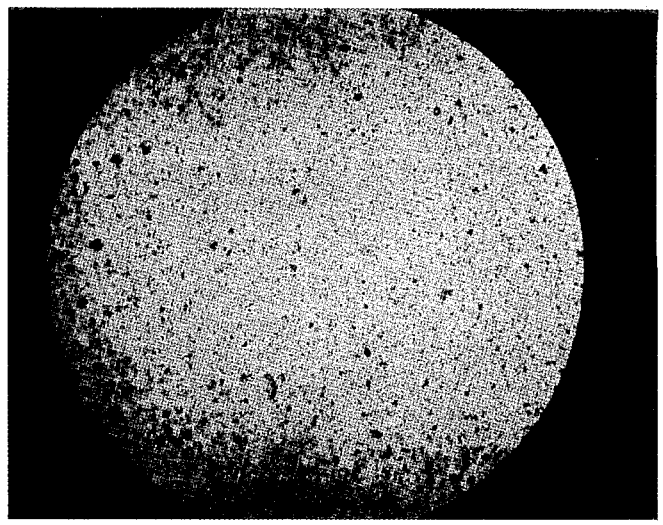
FIGS. 2 and 3 present photomicrographs (at a magnification of 25 and 100 times respectively) of uranium dioxide pellets produced according to the teachings of Example 2.
Figure 3:
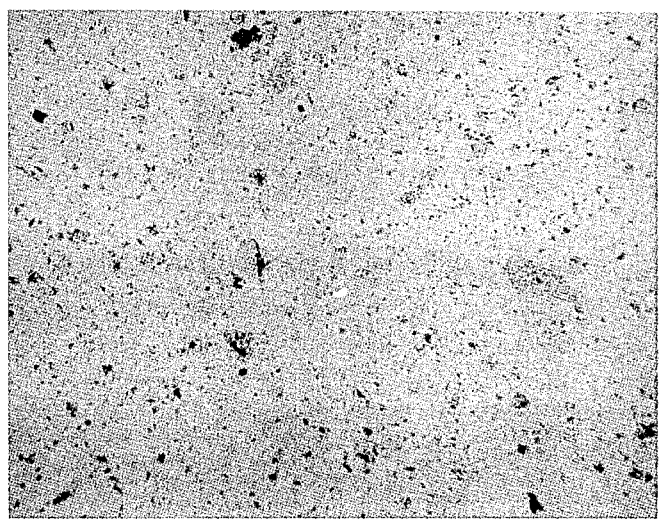
Figure 4:
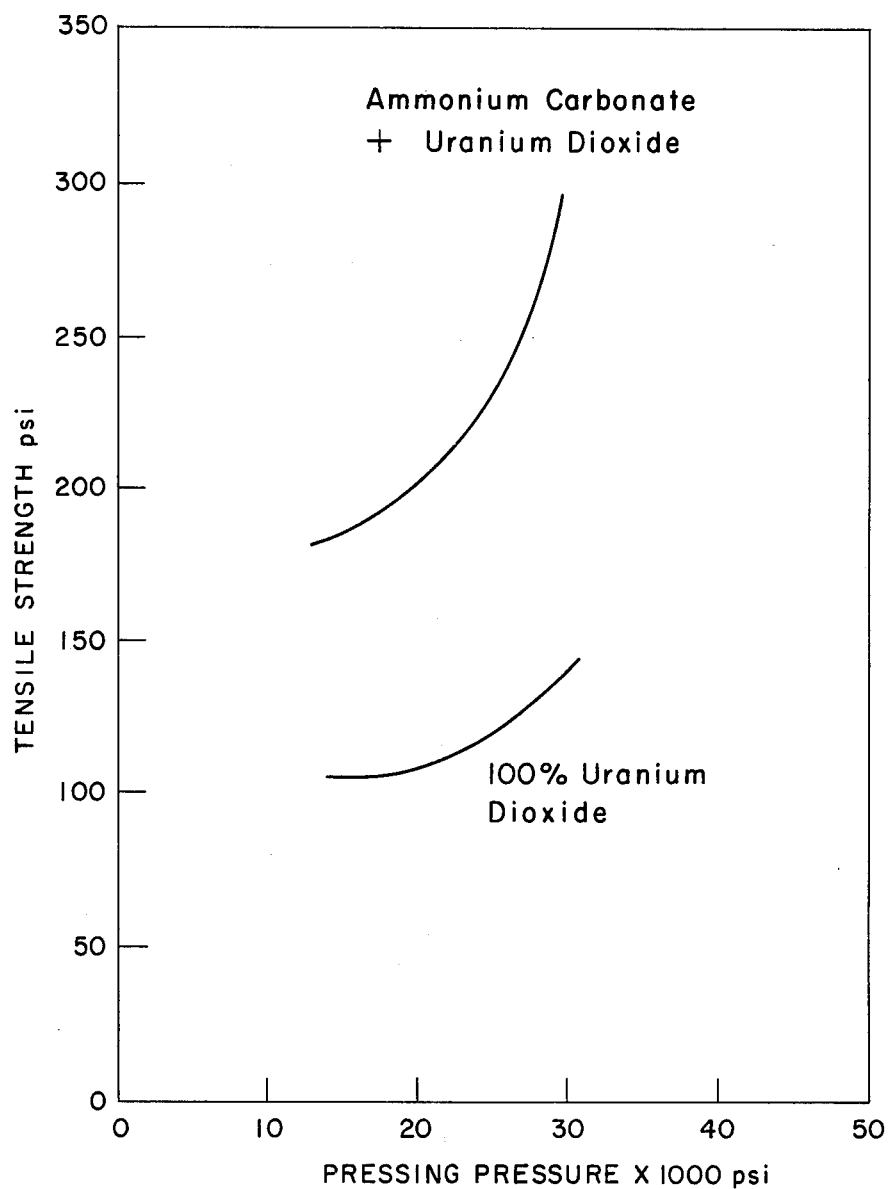
FIG. 4 presents a graph of tensile strength versus die pressing pressure for one group of unsintered pellets without a binder and one group of unsintered pellets with a binder disclosed in this invention.

Typical photomicrographs of a sectioned pellet, at 25 times and 100 times magnification, are shown in FIGS. 2 and 3 respectively. The structure shows a uniform distribution of fine pores in a uranium dioxide matrix. The pore sizes are similar to those observed in uranium dioxide pellets fabricated without the assistance of a binder. No additional pore forming was observed from the amount of the ammonium bicarbonate binder used in this Example.

The pellets fabricated from the binder containing uranium dioxide were center ground to a desired diameter with a 96.6% yield of good quality pellets. In contrast, another batch of uranium dioxide pellets fabricated by the same procedure, but without binder, had only a 77% yield of good quality pellets.

EXAMPLE 3

Five thousand grams of uranium dioxide powder having an oxygen to uranium ratio of 2.04 were placed in a 2½ gallon rubber lined ball mill, one-half filled with ⅜ inch stainless steel balls. The powder was dry milled for 6 hours.

Reagent grade ammonium carbonate binder was hammer milled to about 20 microns in particle size. The binder was added to the uranium dioxide in the ball mill and milled for 15 minutes. The ball mill was emptied and the balls screened from the binder containing powder.

Cylindrical fuel pellets were pressed from the powder at pressures ranging from 15,000 to 29,000 psi. Since the powder was not die pressed to increase its bulk density and the resulting structures were crushed through a sizing screen, poor powder flowability resulted, making die pressing difficult. However, good fuel pellets were obtained during the die pressing. As a reference, another portion of the same batch of uranium dioxide powder was processed through 6 hours of ball milling without the addition of a binder and die pressed into pellets. This batch of powder also possessed poor flowability.

Tensile strengths as measured by diametral compression tests were made on the ammonium carbonate containing pellets and the reference pellets. The results demonstrated that the use of ammonium carbonate as a binder significantly increases tensile strengths at all pressing pressures.

The balance of both groups of pellets were sintered in the furnace according to the procedure described in Example 2. The sintered pellets fabricated with the ammonium carbonate binder yielded sintered theoretical density curves approximately 2.6% lower than the reference pellets without the ammonium carbonate binder. Therefore ammonium carbonate can be used to give a combination of binding action and pore forming action for the sintered pellets.

The carbon analysis, total outgas, and O/U measurements on the pellets fabricated with the assistance of ammonium carbonate were respectively 5 ppm, 3 microliters/gram, and 2.003. The reference group of pellets without the ammonium carbonate binder had a carbon content of 6 ppm, total outgas content of 3 microliters/gram, and an O/U ration of 2.004. All analyses were conducted the same for both series of pellets.

As will be apparent to those skilled in the art, various modifications and changes may be made in the invention described herein. It is accordingly the intention that the invention be construed in the broadest manner within the spirit and scope as set forth in the accompanying claims.

What is claimed is:

1. A process for sintering a body of nuclear fuel material comprising the steps of
   a. admixing the nuclear fuel material in a particulate form with a binder having a particle size less than 400 mesh so as to achieve a uniform dispersal of said binder in the nuclear fuel material so that said binder and said nuclear fuel material undergo adhesion, said binder being comprised of ammonium bicarbonate, ammonium bicarbonate carbamate, ammonium sesquicarbonate, ammonium carbamate and mixtures thereof,
   b. forming the resulting mixture by pressing into a green body having a density ranging from about 30% to about 70% of theoretical density,
   c. heating said green body at a temperature sufficient to decompose substantially all of the binder into gases that enter an atmosphere maintained over said green body,
   d. heating the body at a temperature sufficient to produce a sintered body and further decompose any binder residues that enter the atmosphere maintained over said body, and
   e. cooling the sintered body in the atmosphere maintained over said body.

2. A process according to claim 1 in which the admixing step is conducted to give from about 0.5 to about 7.0 weight percent binder in the mixture with the nuclear fuel material.

3. A process according to claim 1 in which the nuclear fuel material is comprised of uranium dioxide and plutonium dioxide.

4. A process according to claim 1 in which the nuclear fuel material is uranium dioxide.

5. A process according to claim 1 in which the binder is ammonium bicarbonate.

6. A process according to claim 1 in which the binder is ammonium bicarbonate carbamate.

7. A process according to claim 1 in which the nuclear fuel material is uranium oxide.

8. A process according to claim 1 in which the binder is ammonium sesquicarbonate.

9. A process according to claim 1 in which the binder is ammonium carbamate.

* * * * *